S. CASEBEER.
Plow-Colter.
No. 57,286. Patented Aug 21, 1866.
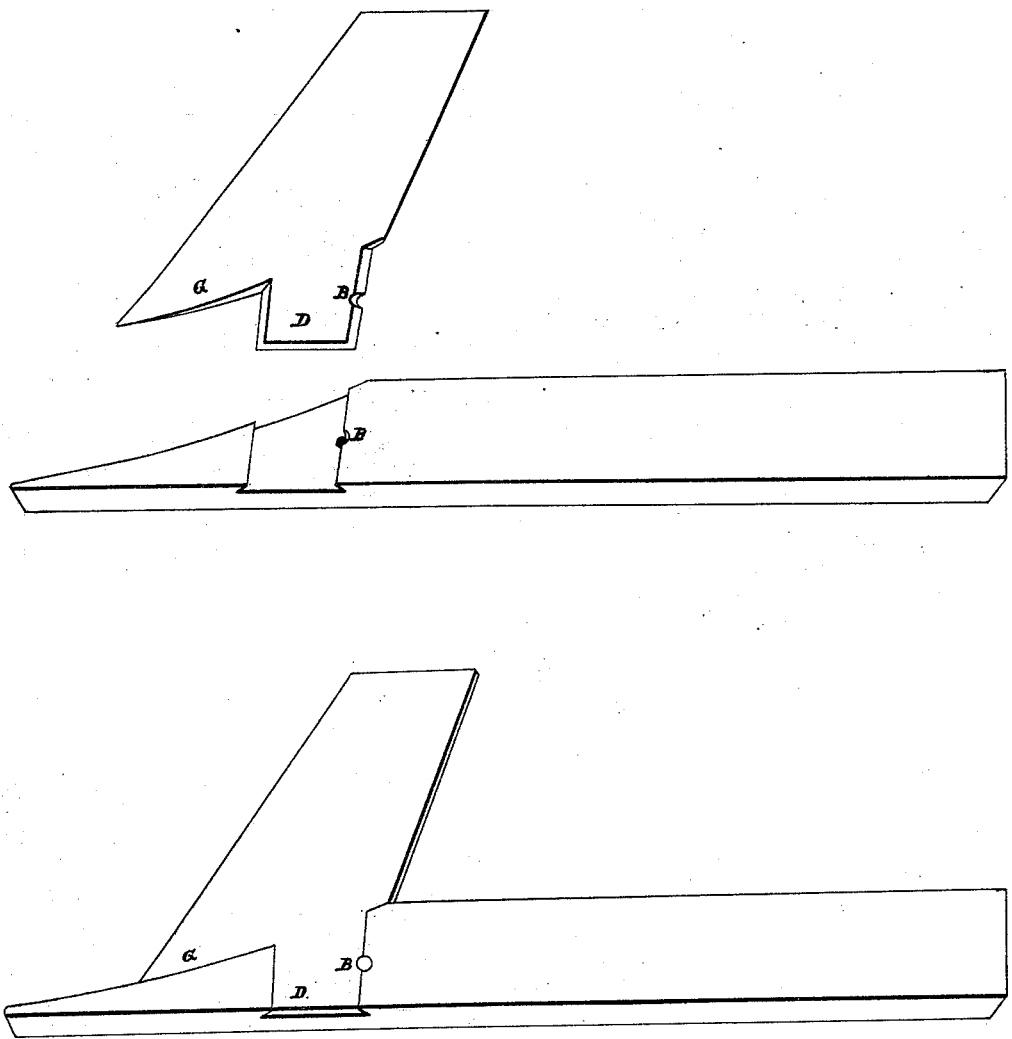
Witnesses:
John T Wolfe
John Easton
Inventor:
Samuel Casebeer

UNITED STATES PATENT OFFICE.

SAMUEL CASEBEER, OF ROSEBURG, OREGON.

IMPROVEMENT IN PLOW-COLTERS.

Specification forming part of Letters Patent No. 57,286, dated August 21, 1866.

*To all whom it may concern:*

Be it known that I, SAMUEL CASEBEER, of the town of Roseburg, in the county of Douglas and State of Oregon, have invented a new and Improved Cutter for Plows; and I do hereby declare that the following is a full and exact description of the same.

The nature of my invention consists in inducing the plow to run lighter and wear much longer. It causes the plow to run steadier, and cuts the sod better than any other kind within my knowledge; nor is it subject to choking up with roots or otherwise, as cutters of other patterns.

I construct my cutters in the form as described in the drawing which accompanies this. They vary in size to suit the plow.

The part designated by the letter D is dovetailed into the bar, while that marked with the letter G is sunk into a groove along the point of the bar. The spot marked by B is a bolt with which the cutter is fastened to the bar.

The cutter is made of shear-steel one-fourth inch thick; however, that depends upon the size of the plow.

What I claim as my invention, and desire to secure by Letters Patent, is—

The application to plows of the aforesaid cutter, in the way and manner herein described.

SAMUEL CASEBEER.

Witnesses:
JOHN T. WOLFE,
JOHN EASTON.